(12) United States Patent
Wu et al.

(10) Patent No.: US 9,112,239 B2
(45) Date of Patent: Aug. 18, 2015

(54) METHOD FOR MODIFYING CATHODE MATERIAL AND LITHIUM BATTERY EMPLOYING THE CATHODE MATERIAL

(75) Inventors: Hung-Chun Wu, Jhubei (TW); Chin-Shu Cheng, Chiayi (TW); Jung-Mu Hsu, Magong (TW); Fu-Ming Wang, Sijhih (TW); Chang-Rung Yang, Taiping (TW); Jing-Pin Pan, Hsinchu Hsien (TW); Ching-Yi Su, Yongkang (TW); Tsung-Hsiung Wang, Dali (TW)

(73) Assignee: INDUSTRIAL TECHNOLOGY RESEARCH INSTITUTE (TW)

( * ) Notice: Subject to any disclaimer, the term of this patent is extended or adjusted under 35 U.S.C. 154(b) by 626 days.

(21) Appl. No.: 12/635,904

(22) Filed: Dec. 11, 2009

(65) Prior Publication Data
US 2010/0167129 A1 Jul. 1, 2010

(30) Foreign Application Priority Data

Dec. 31, 2008 (TW) ............................. 097151797 A
Sep. 4, 2009 (TW) ............................. 098129864 A

(51) Int. Cl.
*H01M 4/48* (2010.01)
*H01M 10/02* (2006.01)
(Continued)

(52) U.S. Cl.
CPC ............ *H01M 10/0525* (2013.01); *H01M 2/34* (2013.01); *H01M 2/348* (2013.01); *H01M 4/131* (2013.01); *H01M 4/136* (2013.01); *H01M 4/621* (2013.01); *H01M 4/622* (2013.01); *H01M 4/623* (2013.01); *H01M 4/624* (2013.01);
(Continued)

(58) Field of Classification Search
CPC . H01M 10/0525; H01M 4/625; H01M 4/626; H01M 4/136; H01M 10/4235; H01M 2/348
USPC ..................... 429/213.95, 122, 232; 29/623.1
See application file for complete search history.

(56) References Cited

U.S. PATENT DOCUMENTS

| 4,857,423 A | 8/1989 | Abraham et al. |
| 5,763,119 A | 6/1998 | Adachi |

(Continued)

FOREIGN PATENT DOCUMENTS

| CN | 101212052 | 7/2008 |
| JP | 11-317230 | 11/1999 |

(Continued)

OTHER PUBLICATIONS

Copy of Office Action dated Jun. 24, 2011 from corresponding application No. CN 200910151296.6.

(Continued)

*Primary Examiner* — Karie O'Neill Apicella
(74) *Attorney, Agent, or Firm* — Lowe Hauptman & Ham, LLP

(57) ABSTRACT

The invention provides a lithium battery, including: a cathode plate and an anode plate; a separator disposed between the cathode plate and the anode plate to define a reservoir region; and an electrolyte filled in the reservoir region. A thermal protective film is provided to cover a material of the cathode plate or the anode plate. When a battery temperature rises over an onset temperature of the thermal protective film, it undergoes a crosslinking reaction to inhibit thermal runaway. A method for fabricating the lithium ion battery is also provided.

38 Claims, 10 Drawing Sheets

(51) Int. Cl.
  *H01M 10/00* (2006.01)
  *H01M 4/62* (2006.01)
  *H01M 10/0525* (2010.01)
  *H01M 2/34* (2006.01)
  *H01M 4/131* (2010.01)
  *H01M 4/136* (2010.01)
  *H01M 10/42* (2006.01)

(52) U.S. Cl.
  CPC ............ *H01M 4/625* (2013.01); *H01M 4/626* (2013.01); *H01M 10/4235* (2013.01); *Y02E 60/122* (2013.01); *Y02T 10/7011* (2013.01); *Y10T 29/49108* (2015.01)

(56) References Cited

U.S. PATENT DOCUMENTS

| | | | |
|---|---|---|---|
| 5,776,627 A | 7/1998 | Mao et al. | |
| 5,858,573 A | 1/1999 | Abraham et al. | |
| 5,879,834 A | 3/1999 | Mao | |
| 6,045,952 A | 4/2000 | Kerr et al. | |
| 6,387,571 B1 | 5/2002 | Lain et al. | |
| 8,715,862 B2 * | 5/2014 | Hwang et al. | 429/247 |
| 2006/0246354 A1 * | 11/2006 | Lee et al. | 429/246 |
| 2007/0281206 A1 * | 12/2007 | Fujikawa et al. | 429/62 |
| 2008/0157021 A1 * | 7/2008 | Wang et al. | 252/62.2 |
| 2008/0160405 A1 * | 7/2008 | Yang et al. | 429/215 |
| 2008/0176141 A1 * | 7/2008 | Pan et al. | 429/325 |

FOREIGN PATENT DOCUMENTS

| | | |
|---|---|---|
| JP | 2002302649 | 10/2002 |
| JP | 2005209469 | 8/2005 |
| JP | 2007026717 | 2/2007 |
| JP | 2007519186 | 7/2007 |
| JP | 2008537293 | 9/2008 |

OTHER PUBLICATIONS

Copy of Office Action dated Apr. 24, 2012 from corresponding Japanese Application No. 2010-0215.

* cited by examiner

METHOD FOR MODIFYING CATHODE MATERIAL AND LITHIUM BATTERY EMPLOYING THE CATHODE MATERIAL

CROSS REFERENCE TO RELATED APPLICATIONS

This Application claims priority of Taiwan Patent Application No. 097151797, filed on Dec. 31, 2008, and Taiwan Patent Application No. 098129864, filed on Sep. 4, 2009, the entirety of which is incorporated by reference herein.

BACKGROUND OF THE INVENTION

1. Field of the Invention

The present invention relates to lithium-ion secondary batteries, and in particular relates to a method for modifying a cathode material for safer lithium-ion secondary batteries.

2. Description of the Related Art

Along with the rapid development and availability of portable electronic products, demand for lithium-ion (Li-ion) secondary batteries, due to their properties, which include having a light weight, high voltage, and high energy density, etc., have increased. Particularly, Li-ion secondary batteries have several advantages which include a high energy density per unit weight, a high operating voltage, and a long life span. Additionally, Li-ion secondary batteries are more environmentally friendly when compared to nickel-cadmium, nickel-hydro and nickel-zinc batteries and are touted as the leading candidate for development of flexible batteries.

Safety is the most important issue in development of Li-ion batteries. In a Li-ion battery, organic solvent (typically ester-based solvent) resistant to high voltages is used. However, the organic solvent is flammable, and when temperature rises due to improper use of the battery, cathode/anode active substances may decompose to produce enough heat to ignite the organic solvent, causing combustion or an explosion.

The exothermic reaction between the electrolyte and cathode material of the Li-ion battery determines whether a Li-ion battery will explode. When charging and discharging Li-ion batteries, oxygen may be released from the cathode due to decomposition or phase transition of the cathode material. The released oxygen will react with the electrolyte and cause an abrupt increase in internal temperature of the Li-ion battery, thus resulting in a serious safety issue.

To address the above issue, conventional approaches employ surface modification of the cathode material to improve Li-ion battery safety, which include coating metal oxide or metal fluoride on an $LiMO_2$ (M represents a transition metal) to increase the structural stability of the cathode material and reduce the amount of heat generated by reaction of the cathode material with the electrolyte. Reference may be made to JP Patent No. 1999-317230; JP Patent No. 2005-209469; W. Lu, J. Liva, Y. K. Sun and K. Amine, *Journal of Power Sources*, 167 (2007) 212; B.-C. Park, H.-B. Kima, S.-T. Myung, K. Amine, I. Belharouak, S.-M. Lee, and Y.-K. Suna, *Journal of Power Sources*, 178 (2008) 826, for further description of the conventional approaches employing surface modifications to cathode material to improve Li-ion battery safety.

However, there still remains a need in the art to improve upon the safety of the cathode material utilized in Li-ion batteries (hereinafter briefly referred to as "Li batteries").

BRIEF SUMMARY OF THE INVENTION

In one aspect, the invention provides a lithium battery, comprising a cathode plate and an anode plate. A separator is disposed between the cathode plate and the anode plate to define a reservoir region and an electrolyte is filled in the reservoir region. The thermal protective film is provided to cover a material of the cathode plate or the anode plate, so that when a battery temperature rises over an onset temperature of the thermal protective film, the thermal protective film undergoes a crosslinking reaction to inhibit thermal runaway. Thus, combustion or an explosion of the lithium battery is prevented, The onset temperature is between about 80° C. and 280° C.

In another aspect, the invention also provides a method for fabricating a lithium battery, comprising: providing an electrode material powder; modifying the electrode material powder with a nitrogen-containing polymer to form a modified electrode material powder; forming a modified electrode plate comprising the modified electrode material powder, a conductive additive and a binder, wherein the nitrogen-containing polymer covers the modified electrode material powder; forming a lithium battery comprising the modified electrode plate; and activating the lithium battery by a charging operation to form a thermal protective film in the modified electrode plate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
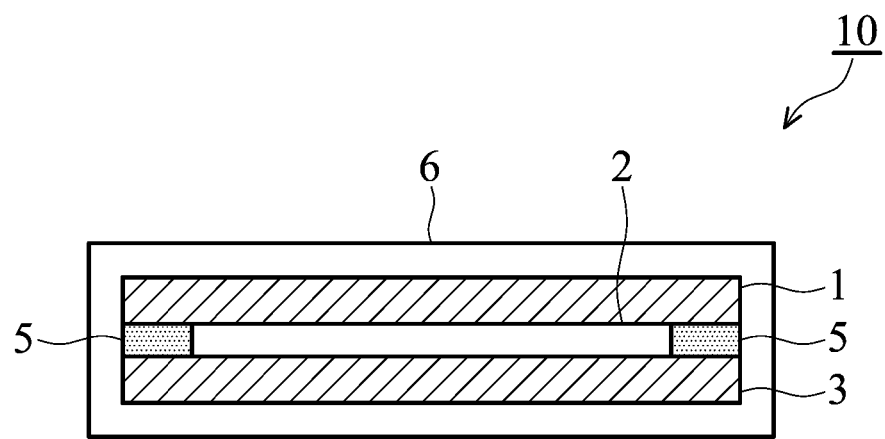
FIG. 1A is a cross section of a lithium battery according to one embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a highly safe Li battery, featuring a thermal protective film covering the surface of the electrode material, which enables a thermal actuation safety mechanism at temperatures of about 80-280° C. to inhibit thermal runaway. The thermal protective film is formed on the surface of the electrode material by modifying electrode material powder with a nitrogen-containing polymer, mixing the modified powder with a conductive additive and a binder to form an electrode paste, and coating and drying the electrode paste.

It is known in the art that the porous separator in a Li battery constructs an internal safety mechanism by melting to close its pores to shutdown short circuit current. In accordance with the invention, a nitrogen-containing polymer with a thermal triggering function is employed to modify the surface of the electrode material to construct another internal safety mechanism. The nitrogen-containing polymer can conduct a redox reaction with either cathode or anode material to form a unique, nanoporous solid electrolyte interface (SEI) protective film. In addition to protecting the cathode or anode material, when a battery temperature rises over an onset temperature of the protective film, it undergoes a crosslinking reaction to block the conduction of ionic current, thus inhibiting thermal runaway. As such, a second safety mechanism for Li batteries is established. By combining these two independent safety mechanisms, a synergetic effect can be obtained to greatly improve the safety of Li batteries. The shutdown performance of Li batteries are drastically improved to prevent excessive heat production due to interior short circuits, thereby reducing the risk of battery combustion or explosion. Conventional Li batteries that use only one safety mechanism may have a sigma quality level of 6. However, with two safety mechanisms, the Li batteries of the preferred embodiment of the invention may have a sigma quality level of 9, or even 12.

The fabrication method of the invention is featured by modifying an electrode material with a nitrogen-containing polymer to form a modified electrode material powder. An electrode plate made of the modified powder forms a unique solid electrolyte interface (SEI) film on the electrode material during battery activation. The SEI film enables a thermal actuation mechanism that reduces or prevents the release of oxygen from the fully charged electrode plate (especially a cathode plate) under elevated temperatures. As such, the exothermic reaction between the electrolyte and the electrode plate can be reduced or avoided to assure the safety of the Li battery, without sacrificing battery life span or other battery performance parameters.

According to the invention, the nitrogen-containing polymer used for modifying the electrode material is preferably a hyper branched polymer formed by the a reaction of (A) amines, amides, imides, maleimides or imines with (B) diones. For the purposes of the invention, the term "nitrogen-containing polymer" refers to polymer compounds having number average molecular weights above 1500 and oligomer compounds having number average molecular weights in the range of from 200 to 2999.

The described amine (A1) can be represented by the following general formula:

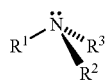

wherein $R^1$, $R^2$, and $R^3$ may be the same or different, and each represents hydrogen, an aliphatic group, or an aromatic group. A primary amine (where $R^2$ and $R^3$ are both hydrogen) is particularly preferred. Illustrative examples of amine (A1) include 1,1'-bis(methoxylcarbonyl)divinyl amine (BDA), N-methyl-N,N-divinylamine, and divinylphenylamine.

The described amide (A2) can be represented by the following general formula:

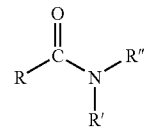

wherein R, R', and R" may be the same or different, and each represents hydrogen, an aliphatic group, or an aromatic group. A primary amide (where R' and R" are both hydrogen) is particularly preferred. Illustrative examples of amide (A2) include N-vinylamide, divinylamide, silyl(vinyl)amides, and glyoxylated-vinyl amide.

The described imide (A3) can be represented by the following general formula:

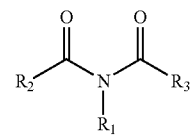

wherein $R^1$, $R^2$, and $R^3$ may be the same or different, and each represents hydrogen, an aliphatic group, or an aromatic group. Illustrative examples of imide (A3) include divinylimides such as N-vinylimide, N-vinylphthalimide, and vinylacetamide.

The described maleimide (A4) includes monomaleimide, bismaleimide, trismaleimide, and polymaleimide, wherein the bismaleimide has the general Formula (I) or (II):

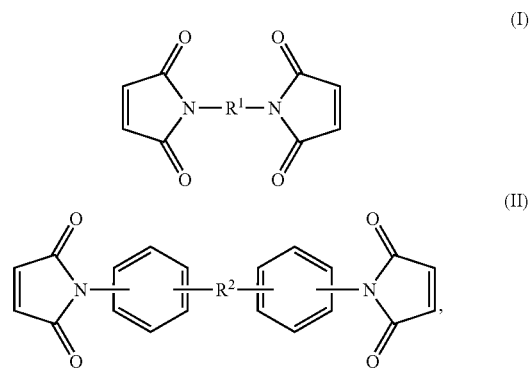

wherein $R^1$ is —$RCH_2R$—, —$RNH_2R$—, —$C(O)CH_2$—, —$CH_2OCH_2$—, —$C(O)$—, —O—, —O—O—, —S—, —S—S—, —$S(O)$—, —$CH_2S(O)CH_2$—, —$(O)S(O)$—, —$C_6H_5$—, —$CH_2(C_6H_5)CH_2$—, —$CH_2(C_6H_5)(O)$—, phenylene, diphenylene, substituted phenylene, or substituted diphenylene, and $R^2$ is —$RCH_2$—, —$C(O)$—, —$C(CH_3)_2$—, —O—, —O—O—, —S—, —S—S—, —$(O)S(O)$—, or —$S(O)$—, and R is $C_{1-6}$ alkyl. Representative examples of the bismaleimide include N,N'-bismaleimide-4,4'-diphenylmethane, 1,1'-(methylenedi-4,1-phenylene)bismaleimide, N,N'-(1,1'-biphenyl-4,4'-diyl) bismaleimide, N,N'-(4-methyl-1,3-phenylene)bismaleimide, 1,1'-(3,3'-dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimide, N,N'- dithiodimaleimide, N,N'-ketonedimaleimide, N,N'-methylene-bis-maleinimide, bis-maleinimidomethyl-ether, 2-bis-(maleimido)-1,2-ethandiol, N,N'-4,4'-diphenylether-bis-maleimide, 4,4'-bis(maleimido)-diphenylsulfone, and the like.

The described imine (A5) can be represented by the following general formula:

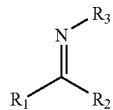

wherein $R^1$, $R^2$, and $R^3$ may be the same or different, and each represents hydrogen, an aliphatic group, or an aromatic group. Illustrative examples of imine (A5) include divinylimine, and allylic imine.

The described dione (B) includes (B1) barbituric acid and derivatives thereof; and (B2) acetylacetone and derivatives thereof.

The described barbituric acid and derivatives thereof (B1) can be represented by the following general formula:

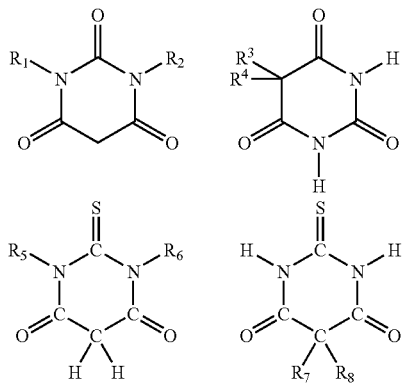

wherein $R^1$ through $R^8$, each independently, represents H, $CH_3$, $C_2H_5$, $C_6H_5$, $CH(CH_3)_2$, $CH_2CH(CH_3)_2$, $CH_2CH_2CH(CH_3)_2$, or

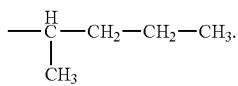

The dione (B) is barbituric acid when $R^1$ and $R^2$ are both hydrogen.

The described acetylacetone and derivatives thereof (B2) can be represented by the following general formula:

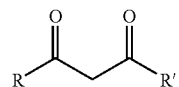

wherein R and R' may be the same or different, and each represents an aliphatic group, an aromatic group, or a heteroaryl group. The dione (B) is acetylacetone when R and R' are both methyl.

The molar ratio of the dione (B) to the amine, amide, imide, maleimide or imine (A) is in the range of about 1:20-4:1, preferably about 1:5-2:1, and more preferably about 1:3-1:1.

The fabrication method of the invention includes directly modifying an electrode material powder with the nitrogen-containing polymer, and mixing the modified powder with a conductive additive and a binder to form an electrode paste composition. The electrode paste composition is then coated on a metal foil (such as an aluminum foil), dried, and roller milled, thereby forming a modified electrode plate.

For example, a cathode material such as a lithium mixed metal oxide powder is modified by the described nitrogen-containing polymer, and mixed with a conductive additive and a binder to form a cathode paste composition. The lithium mixed metal oxide powder includes, but are not limited to, $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M is a transition metal), $LiMn_{0.5}Ni_{0.5}O_2$, $LiNi_xCO_yMn_zO_2$ (x+y+z=1), $LiNi_xCo_yAl_zO_2$ (x+y+z=1), $LiMc_{0.5}Mn_{1.5}O_4$ (Mc is a bivalent metal), or combinations thereof. The particle size of the cathode material powder may range from about 1 μm to about 30 μm.

In one embodiment, the lithium mixed metal oxide powder is mixed with a solution of the nitrogen-containing polymer by stirring at room temperature for 1-5 days, preferably 2-3 days, to complete the modification. The lithium mixed metal oxide powder and the nitrogen-containing polymer solution are preferably present in a volume ratio of about 1:1-4, and more preferably about 1:2. The nitrogen-containing polymer solution preferably has a solid content of about 1-20% by weight, and more preferably about 1-5% by weight. Suitable solvents for the nitrogen-containing polymer solution include, but are not limited to, γ-butyrolactone, propylene carbonate, and N-methylpyrollidone (NMP), singly or admixtured with one another to provide a co-solvent system.

The modified cathode material powder is preferably subjected to filtering, washing, and drying for purification. For example, the modified powder is filtered out from the reaction mixture by using filter paper, re-dispersed in twice the volume of solvent with thorough mixing, and re-filtered. This operation may be repeated for several times, and the re-filtered powder is finally dried to provide a purified powder.

Thereafter, the modified cathode material powder, a conductive additive, and a binder are dispersed in a solvent to provide a cathode paste composition. The modified cathode material powder, the conductive additive, and the binder are present in a weight ratio of about 80-93:0.1-5:0.1-5, preferably about 91:6:3. Suitable conductive additives include, but are not limited to, carbon black, graphite, acetylene black, nickel powder, aluminum powder, titanium powder, stainless steel powder or combinations thereof. The binder can improve the mechanical properties of the electrode. Suitable binders include, but are not limited to, polyvinylidene fluoride (PVdF), styrene-butadiene rubber (SBR), polyamide, melamine resin, or combinations thereof. Suitable solvents for forming the cathode paste composition include, but are not limited to, γ-butyrolactone, propylene carbonate, and N-methylpyrollidone (NMP), singly or admixtured with one another to provide a co-solvent system. In addition, the cathode paste composition may optionally include other additives such as a surfactant, an initiator, and so on.

The cathode paste composition is then coated on a metal foil (such as an aluminum foil), dried, and roller milled to form a modified cathode plate, wherein the nitrogen-containing covers the surface of the cathode material and forms a thermal protective film during battery activation. The above drying process is preferably carried out at a temperature of about 100-150° C.

Although the above method is explained with reference to a cathode electrode, the same processing steps may be implemented to form a modified anode electrode. For example, an anode material powder can be mixed with a solution of the nitrogen-containing polymer by stirring at room temperature for 1-5 days, preferably 2-3 days, to complete the modification. The anode material powder and the nitrogen-containing polymer solution are preferably present in a volume ratio of about 2:1-1:5, and more preferably about 1:1-1:2. The nitrogen-containing polymer solution preferably has a solid content of about 1-20% by weight, and more preferably about 1-5% by weight. Suitable solvents for the nitrogen-containing polymer solution include, but are not limited to, γ-butyrolactone, propylene carbonate, and N-methylpyrollidone (NMP), singly or admixtured with one another to provide a co-solvent system. The anode paste composition thus obtained is then coated on a metal foil (such as an aluminum foil), dried, and roller milled to form a modified anode plate.

FIG. 1A shows a cross section of a lithium battery 10 according to one embodiment of the invention. The lithium battery 10 includes a pair of a cathode plate 1 and an anode plate 3, wherein the cathode plate 1 is the modified cathode plate fabricated by the above described method. A separator 5 is disposed between the cathode plate 1 and the anode plate 3 to define a reservoir region 2. The reservoir region 2 is filled with an electrolyte. In addition, the described structure, including the cathode plate 1, anode plate 3, separator 5, and electrolyte, is wrapped by a sealant structure 6.

The described anode plate 3 may include carbonaceous material, metal, or lithium alloy. The carbonaceous material can be carbon powder, graphite, carbon fiber, carbonanotube, or combinations thereof. In one embodiment, the carbonaceous material is the carbon powder with a diameter of about 1 μm to 30 μm. The metal-based anode can be Al, Zn, Bi, Cd, Sb, Si, Pb, Sn, $Li_3FeN_2$, $Li_{2.6}Co_{0.4}N$, $Li_{2.6}Cu_{0.4}N$ or combinations thereof. In addition, the anode plate 3 may further include metal oxide such as SnO, $SnO_2$, GeO, $GeO_2$, $InO_2$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, ZnO, CoO, NiO, FeO, $TiO_2$, $Li_3Ti_5O_{12}$ or combinations thereof. The anode 3 may further include a binder such as polyvinylidene fluoride (PVdF), styrene-butadiene rubber (SBR), polyamide, melamine resin, or combinations thereof.

The described separator 5 is an insulation material, e.g. polyethylene (PE), polypropylene (PP), or multi-layered structure such as PE/PP/PE.

The major components of the described electrolyte are organic solvent, lithium salt, and additives. The organic solvent can be γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or combinations thereof. The lithium salt can be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, $LiB(C_2O_4)_2$ or combinations thereof.

Figure 1B:
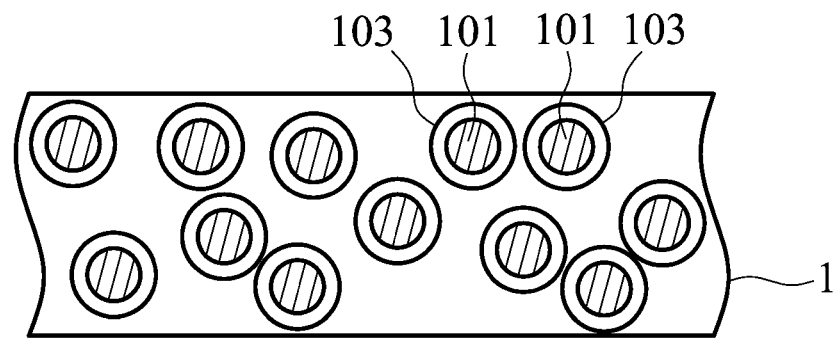
FIG. 1B is a schematic enlarged view of a portion of a modified cathode plate.

FIG. 1B is a schematic enlarged view of a portion of the modified cathode plate 1. When a battery is activated, the modified cathode plate 1 of the invention forms an amorphous nitrogen-containing SEI film 103 covering the surface of the electrode material 101. The nitrogen-containing SEI film is referred to as the "thermal protective film". As identified by Ar ion sputtering, the thermal protective film is a nanostructure having a thickness of not less than 25 nm, for example about 30-150 nm, preferably about 40-100 nm. When the battery temperature rises, terminal functional groups of the thermal protective film undergo a crosslinking reaction to block the conduction of lithium ions and suppress or reduce the release of oxygen from the cathode plate, thereby reducing the exothermic reaction between the electrolyte and the cathode plate and improving the safety of Li batteries.

The temperature triggering the thermal crosslinking reaction is referred to as the "onset temperature". In one embodiment, the nitrogen-containing polymer is a polymer formed from bismaleimide and barbituric acid. The terminal functional groups of such a polymer include vinyl groups (derived from bismaleimide) and amino groups (derived from barbituric acid). When the battery temperature is increasing, the temperature triggering a crosslinking reaction between the vinyl groups and the amino groups is referred to as the onset temperature. According to the invention, the onset temperature is preferably at about 80-280° C., and more preferably about 100-220° C., and even more preferably about 130-200° C.

Figure 3A:
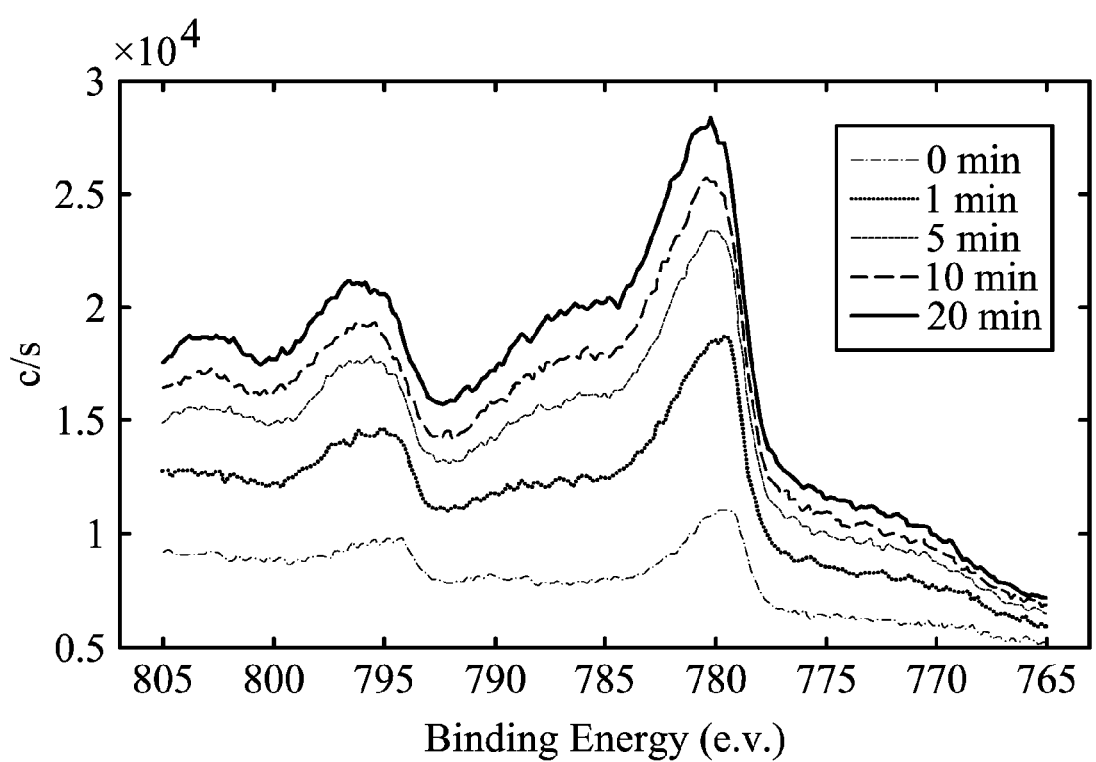
FIGS. 3A-3B are Co-2p XPS spectra of cathode plates of a Comparative Example and an Example, respectively.
Figure 3B:
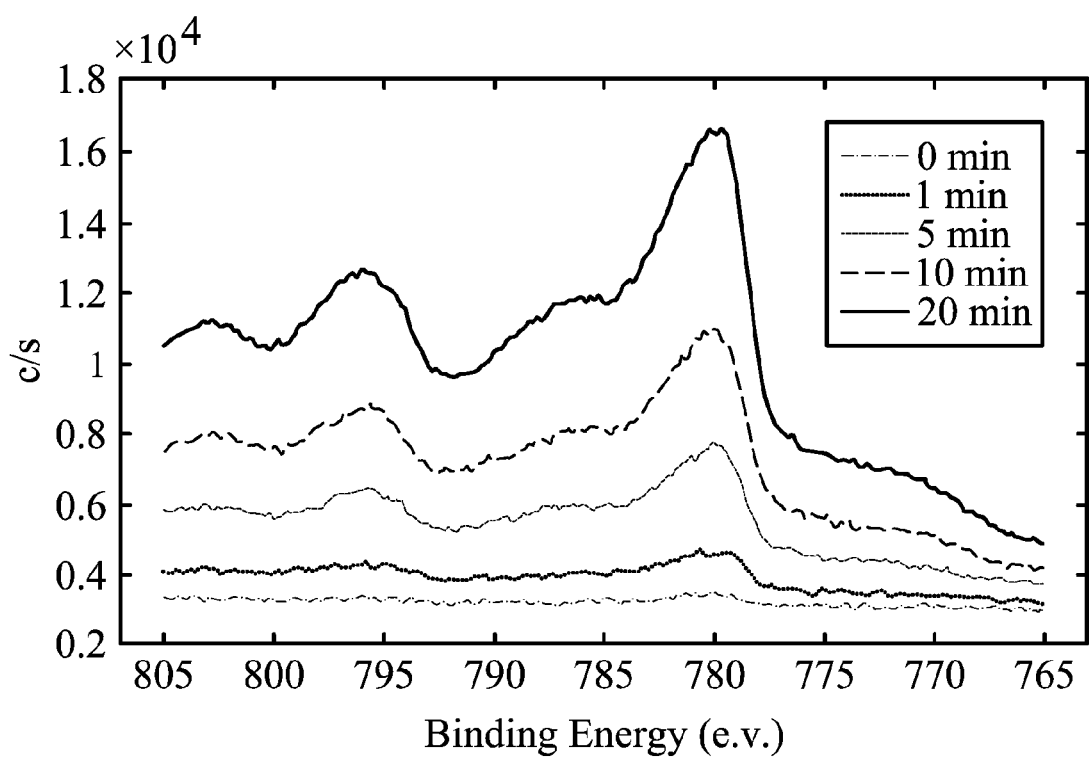

While a conventional Li battery may also form a nitrogen-containing SEI film due to the presence of a nitrogen-based additive (such as a nitrogen-containing binder or electrolyte), the nitrogen-containing SEI film usually has a thickness of less than 30 nm and poorly covers the electrode material. Furthermore, the conventional N-containing SEI film is not capable of inhibiting thermal runaway due to the lack of a thermal actuation mechanism. The poor coverage of conventional SEI films is confirmed by observing the transition metal 2p signal of the cathode plate according to an X-ray photoelectron spectroscopy (XPS) analysis. FIGS. 3A-3B are Co-2p XPS spectra of the cathode plates of the Comparative Example (FIG. 3A) and the Example (FIG. 3B), respectively. In FIG. 3A, in absence of the thermal protective film, the difference between the peak areas of a transition metal 2p signal at 5 minutes and 0 minutes ($A_{5mins}/A_{0mins}$) is small. However, in FIG. 3B, with the thermal protective film, the ratio of peak areas of a transition metal 2p signal at 5 minutes to 0 minutes is greater than 6. Referring FIG. 4D, the Co-2p signal (at 775-790 e.v.) of the cathode plate without the thermal protective film is about 8-10 times greater than that with the thermal protective film.

Accordingly, the invention provides a Li battery with improved safety, wherein a nitrogen-containing polymer with a thermal triggering function is employed to modify the electrode material. The nitrogen-containing polymer enables a thermal actuation safety mechanism to allow the battery to pass nail puncture tests without sacrificing battery life span or other battery performance parameters. The Li battery of the invention can be widely used in 3C products, electric vehicles, light electric vehicles, or large-scale electricity storage systems that demand high safety.

While the foregoing discussion has been presented within the context of a nitrogen-containing polymer to form the thermal protective film, the invention is not so limited. Rather, other materials enabling a thermal actuation safety mechanism and capable of uniformly covering cathode or anode materials may be used instead. For example, a sulfur-containing polymer can be used to form the thermal protective film, and its onset temperature can be controlled by the choice of monomers and crosslinking groups. Suitable sulfur-containing polymers include organic polymers containing sulfenyl groups, sulfonic groups, and thioureido groups. The sulfur-containing polymers show S-1s signals when analyzed by an X-ray photoelectron spectroscopy (XPS).

SYNTHETIC EXAMPLES 1-9

(1) 2.55 g (0.071M) N,N'-4,4'-diphenylmethane-bismaleimide and 0.45 g (0.035M) barbituric acid were placed in a 500 mL four-necked flask, and 97 g NMP was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer was a hyper branched bismaleimide oligomer with a degree of branching of about 75%. The thermal crosslinking reaction temperature of the nitrogen-containing polymer was about 80-90° C. as determined by DSC (differential scanning calorimetry) at a heating rate of 10° C./min under a nitrogen atmosphere.

(2) 2.55 g (0.071M) N,N'-4,4'-diphenylmethane-bismaleimide and 0.45 g (0.035M) barbituric acid were placed in a 500 mL four-necked flask, and 97 g γ-butyrolactone (GBL) was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer had a degree of branching of about 65%. The thermal crosslinking reaction temperature of the nitrogen-containing polymer was about 120-130° C. as determined by DSC at a heating rate of 10° C./min under a nitrogen atmosphere.

(3) 2.55 g (0.071M) N,N'-4,4'-diphenylmethane-bismaleimide and 0.45 g (0.035M) barbituric acid were placed in a 500 mL four-necked flask, and 97 g of a 1:1 mixture by weight of NMP and GBL was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer has a degree of branching of about 70%. The thermal crosslinking reaction temperature of the nitrogen-containing polymer was about 90-100° C. as determined by DSC at a heating rate of 10° C./min under a nitrogen atmosphere.

(4) 2.55 g (0.071M) N,N'-4,4'-diphenylmethane-bismaleimide and 0.45 g (0.045M) acetylacetone were placed in a 500 mL four-necked flask, and 97 g of N,N-dimethylformamide (DMF) was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer had a degree of branching of about 50%. The thermal crosslinking reaction temperature of the nitrogen-containing polymer was about 170-190° C. as determined by DSC at a heating rate of 10° C./min under a nitrogen atmosphere.

(5) 2.55 g (0.071M) N,N'-4,4'-diphenylmethane-bismaleimide and 0.45 g (0.029M) 1,3-dimethylbarbituric acid were placed in a 500 mL four-necked flask, and 97 g of a 4:6 mixture by volume of propylene carbonate and diethyl carbonate (DEC) was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer had a degree of branching of about 65%. The thermal crosslinking reaction temperature of the nitrogen-containing polymer was about 220-230° C. as determined by DSC at a heating rate of 10° C./min under a nitrogen atmosphere.

(6) 2.275 g (0.064M) N,N'-4,4'-diphenylmethane-bismaleimide, 0.275 g (0.048M) N-phenylmaleimide and 0.45 g (0.035M) barbituric acid were placed in a 500 mL four-necked flask, and 97 g NMP was later added, wherein the mixture was stirred till the reactants were completely dissolved. Next, the dissolved reactants mixture was stirred at 130° C. for 48 hours under an atmosphere of nitrogen to form a nitrogen-containing polymer solution with a solid content of 3.0%. The nitrogen-containing polymer had a degree of branching of about 55%. The thermal crosslinking reaction temperature of the nitrogen-containing polymer was about 160-200° C. as determined by DSC at a heating rate of 10° C./min under a nitrogen atmosphere.

(7) 9.311 g (0.538M) N-phenylmaleimide and 0.689 g (0.054M) barbituric acid were placed in a 500 mL four-necked flask, and 97 g NMP was later added, wherein the mixture was stirred till the reactants were completely dissolved. Next, the dissolved reactants mixture was stirred at 130° C. for 96 hours under an atmosphere of nitrogen to form a nitrogen-containing polymer solution with a solid content of 3.0%. The nitrogen-containing polymer had a degree of branching of about 50%. The thermal crosslinking reaction temperature of the nitrogen-containing polymer was about 180-210° C. as determined by DSC at a heating rate of 10° C./min under a nitrogen atmosphere.

(8) 4.053 g (0.030M) 2-vinyl-4,6-diamino-1,3,5-triazine and 0.947 g (0.008M) barbituric acid were placed in a 500 mL four-necked flask, and 95 g NMP was later added, wherein the mixture was stirred till the reactants were completely dissolved. Next, the dissolved reactants mixture was stirred at 130° C. for 24 hours under an atmosphere of nitrogen to form a nitrogen-containing polymer solution with a solid content of 5%. The nitrogen-containing polymer had a degree of branching of about 65%. The thermal crosslinking reaction temperature of the nitrogen-containing polymer was about 110-140° C. as determined by DSC at a heating rate of 10° C./min under a nitrogen atmosphere.

(9) 5.748 g (0.033M) 2-vinylphthalimide and 4.252 g (0.033M) barbituric acid were placed in a 500 mL four-necked flask, and 90 g NMP was later added, wherein the mixture was stirred till the reactants were completely dissolved. Next, the dissolved reactants mixture was stirred at 130° C. for 16 hours under an atmosphere of nitrogen to form a nitrogen-containing polymer solution with a solid content of 10%. The nitrogen-containing polymer had a degree of branching of about 70%. The thermal crosslinking reaction temperature of the nitrogen-containing polymer was about 230-260° C. as determined by DSC at a heating rate of 10° C./min under a nitrogen atmosphere.

EXAMPLE

LiCoO$_2$ powder was added to the bismaleimide oligomer solution obtained by the Synthetic Example 1 with a volume ratio of 1:2 and the resulting mixture was stirred for 3 days at room temperature to complete the modification.

Next, the modified LiCoO$_2$ powder was filtered out from the reaction mixture by using filter paper, re-dispersed in twice the volume of NMP with thorough mixing, and re-filtered. The procedure was repeated for three times. Finally, the modified LiCoO$_2$ powder was spread over an aluminum foil paper and dried at 130° C. for 1 hour to complete the purification of the modified LiCoO$_2$ powder.

91 g purified, modified LiCoO$_2$ powder, 6 g KS6 conductive additive, and 3 g poly(vinylidenefluoride) binder were dispersed in NMP, forming a cathode paste. The cathode paste was coated on an aluminum foil, dried at 130° C., compressed, and cut to form a cathode plate.

The obtained cathode plate and a graphite-based MCMB 2528 (Osaka Gas Co.) anode plate were wound into a jelly-roll battery cell with a PP/PE/PP membrane as a separator. The jelly-roll battery cell was placed in an aluminum outer case to form a 503759 battery (0.5 cm×3.7 cm×5.0 cm) with three sealed sides (sealing conditions: 4.0 kgf/cm$^2$, 180° C./3s) and one non-sealed side. Next, 4.2 g of a standard Li-battery electrolyte containing 1M LiPF$_6$ in ethylene carbonate (EC), propylene carbonate (PC), and diethyl carbonate (DEC) (volume ratio of EC:PC:DEC=3:2:5) was added into the battery cell from the non-sealed side, and then the battery was vacuum sealed (sealing conditions: 4.0 kgf/cm$^2$, 180° C./3s). Thereafter, a formation procedure was performed to initialize the battery to normal operation.

COMPARATIVE EXAMPLE 1

The same procedure as in the Example described previously was repeated, except that the modified LiCoO$_2$ powder for forming the cathode plate was replaced by a non-modified LiCoO$_2$ powder.

COMPARATIVE EXAMPLE 2

The same procedure as in the Example described previously was repeated, except that the LiCoO$_2$ powder was modified by 2 wt % biphenyl (a conventional polymerizable electrolyte additive).

Activation Charge Test

Figure 2A:
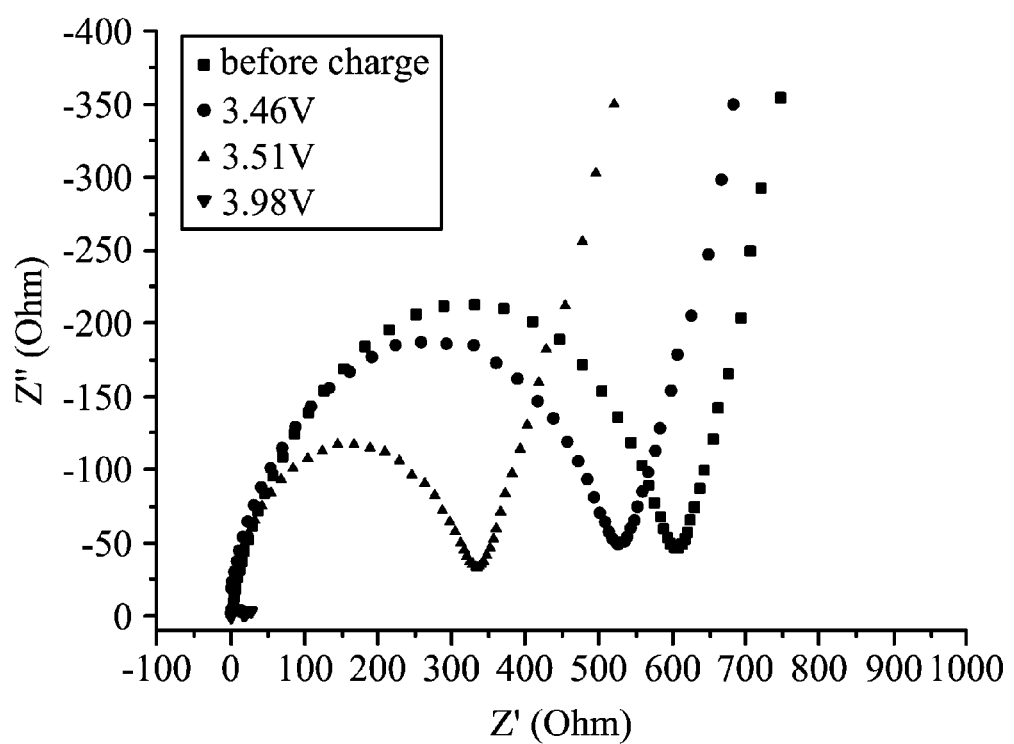
FIGS. 2A-2B are AC impedance spectra of coin-type half cells of an Example and a Comparative Example, respectively, during battery activation.
Figure 2B:
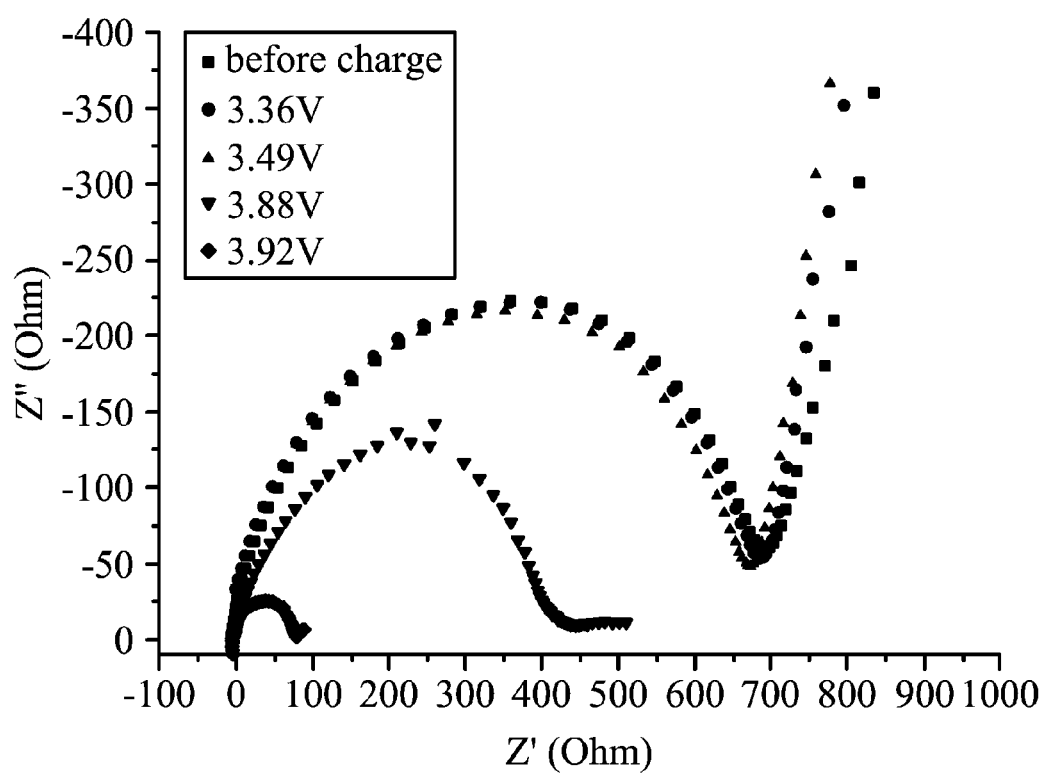

The LiCoO$_2$ cathode plates of the Example and the Comparative Example were assembled into coin-type half cells, and left standing for one day. Next, activation charge tests were performed at a voltage of 4.3V. FIGS. 2A and 2B are AC impedance spectras of coin-type half cells of the Example (FIG. 2A) and the Comparative Example (FIG. 2B), respectively, during battery activation.

Before charging, the AC impedance of the sample cells of the Example and the Comparative Example were almost the same. However, during activation, the sample cell modified by the nitrogen-containing polymer exhibited a higher solid-liquid interface resistance (a larger semi-circle in the spectrum) compared to the non-modified cell at similar voltages. The higher resistance can be attributed to the formation of a thicker SEI film due to participation of the nitrogen-containing polymer during activation.

XPS Surface Analysis

The LiCoO$_2$ cathode plates of the Comparative Example and the Example were assembled into coin-type half cells and fully charged at 4.3V. Next, the half cells were disassembled in a glove box under an atmosphere of Ar. The disassembled LiCoO$_2$ cathode plates were washed by dimethyl carbonate (DMC), dried, and subjected to XPS (X-ray photoelectron spectrometer) analysis. FIGS. 3A-3B are Co-2p XPS spectra of the cathode plates of the Comparative Example (FIG. 3A) and the Example (FIG. 3B), respectively. The sputtering was carried out at a sputter rate of 2.3 nm/min for SiO$_2$. At the start time (0 min), the non-modified LiCoO$_2$ cathode plate had an obvious Co signal, while the modified LiCoO$_2$ cathode plate did not have an obvious Co signal, indicating the presence of the thicker SEI film provided on the modified cathode plate.

After 5 minutes of an Ar ion sputtering process, the Co signal in the modified LiCoO$_2$ cathode plate increased to became more obvious as process time increased.

Accordingly, in FIG. 3A, the difference between the peak areas of transition metal 2p signal at 5 minutes and 0 minutes ($A_{5mins}/A_{0mins}$) is small, while the difference is significant in FIG. 3B due to the presence of the thermal protective film. As a result of integral calculation, the ratio of peak areas of transition metal 2p signal (775-790 e.v.) at 5 minutes to 0 minutes ($A_{5mins}/A_{0mins}$) is 11 in FIG. 3B, while the ratio is only 5 in FIG. 3A.

Figure 4A:
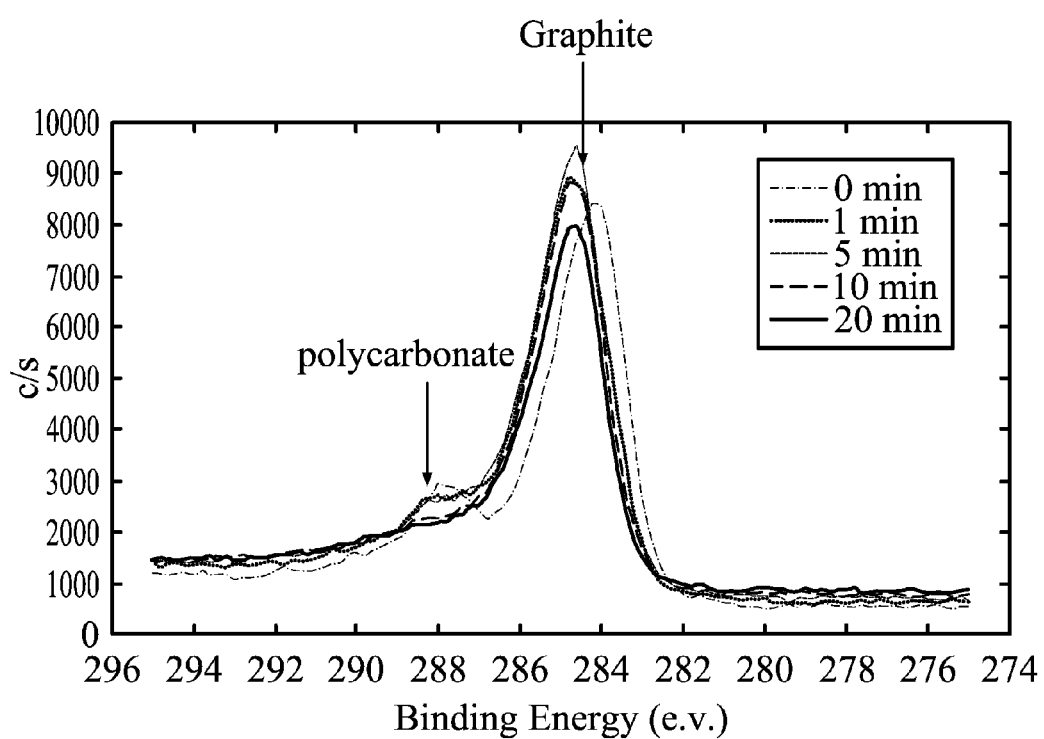
FIGS. 4A-4B are C-1s and N-1s XPS spectra, respectively, of a modified cathode plate of an Example.
Figure 4B:
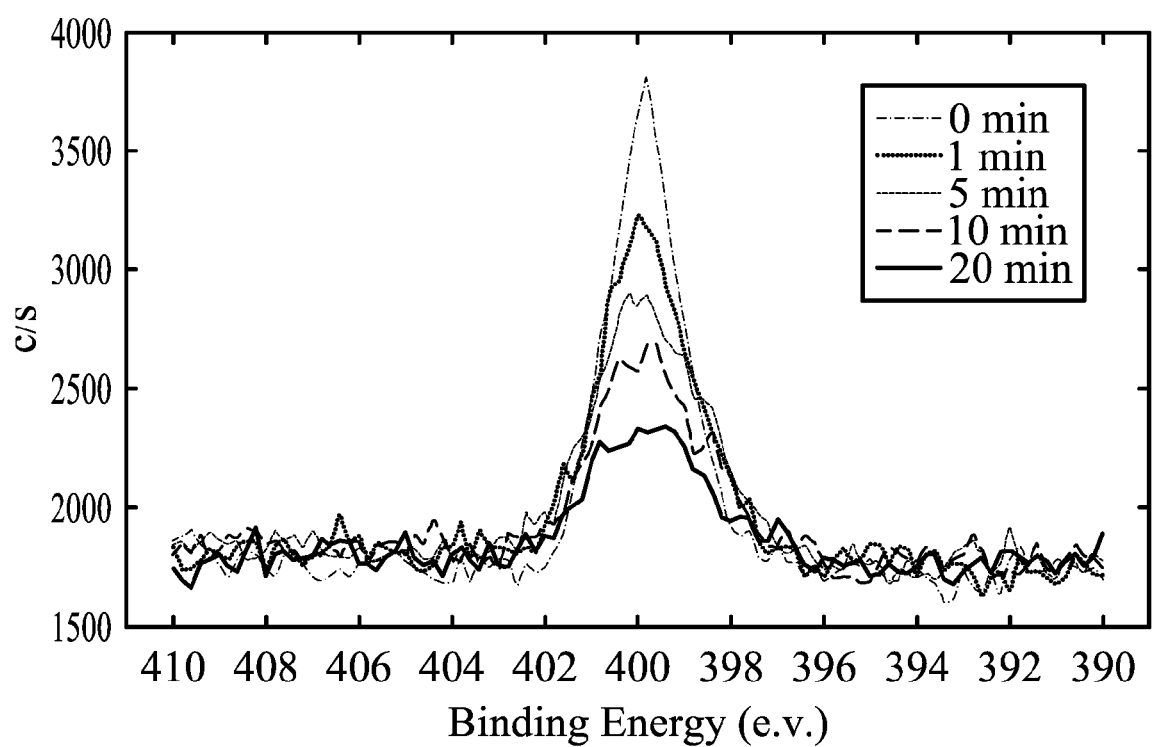

FIGS. 4A-4B are C-1s and N-1s XPS spectras, respectively, of the modified cathode plate of the Example. As shown in the figures, in addition to the conventional SEI composition (polycarbonate), the modified LiCoO$_2$ cathode plate had a nitrogen-containing SEI film. The N-1s signal remained intense even after 20 minutes of the Ar ion sputtering process. This indicated that the bismaleimide oligomer was oxidized onto the surface of the LiCoO$_2$ cathode during battery activation.

Figure 4C:
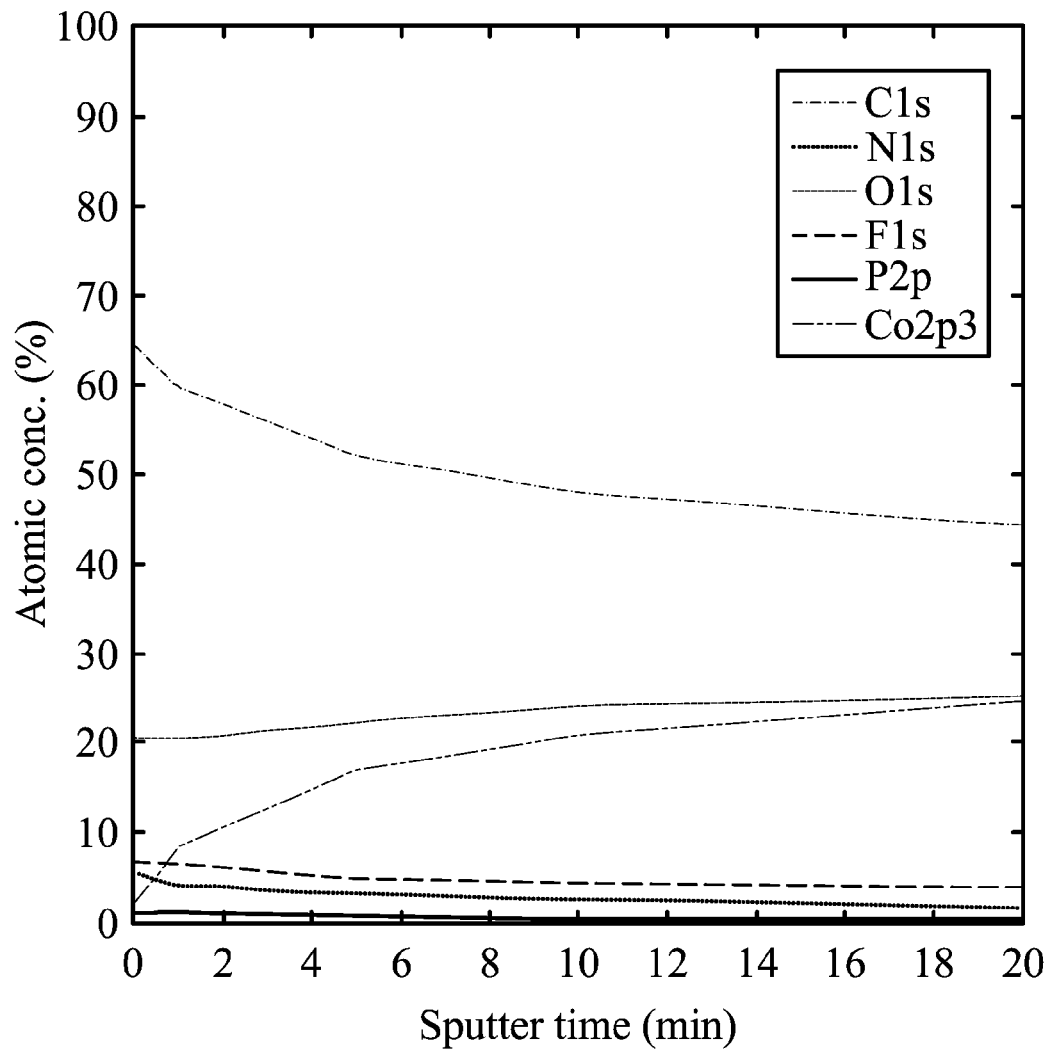
FIG. 4C is a graph showing atomic concentration of a modified cathode plate as a function of sputter time.

FIG. 4C is a graph showing atomic concentration of the modified cathode plate as a function of sputter time, wherein the sputter time is proportional to sample depth. After 20 minutes of the Ar ion sputtering process, the increasing rate of the Co concentration gradually moderated, indicating that the SEI film was gradually sputtered off from the electrode plate. The thickness of the nitrogen-containing SEI film was evaluated to be about 40-50 nm according to the Ar ion sputter rate for SiO$_2$ (2.3 nm/min).

Figure 4D:
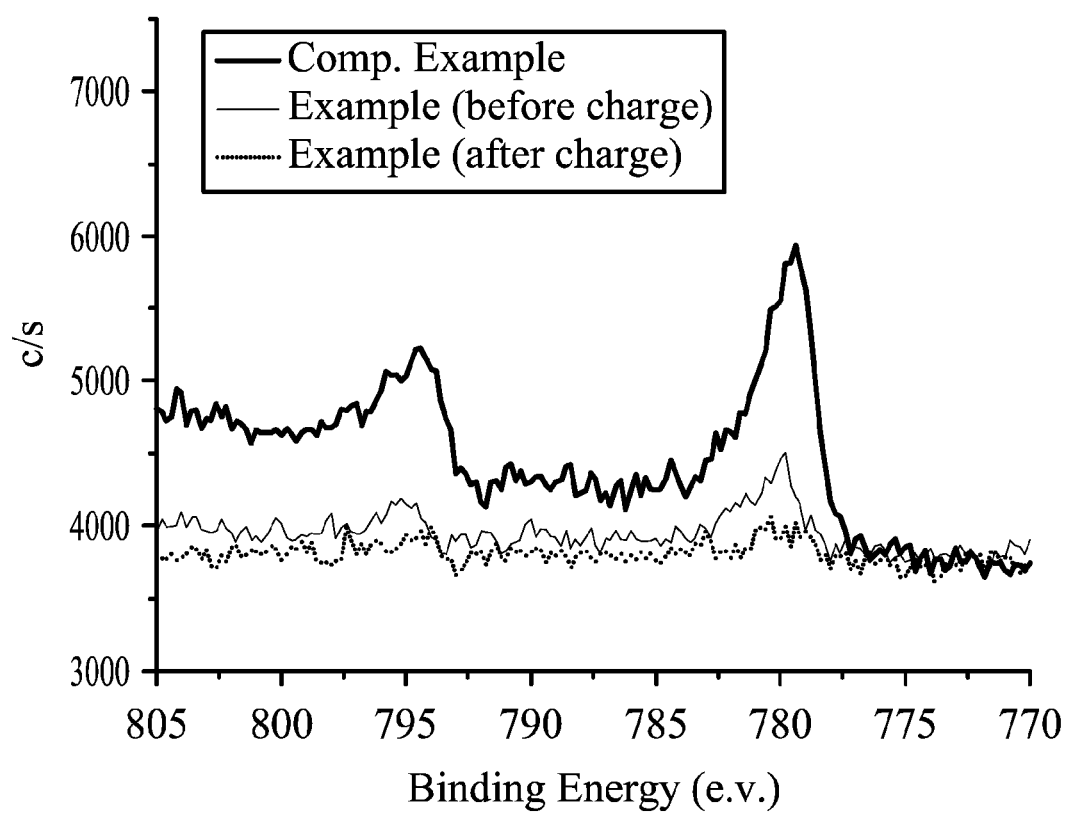
FIG. 4D is Co-2p XPS spectra of cathode plates of a Comparative Example and an Example before/after activation charge.

FIG. 4D is Co-2p XPS spectra of cathode plates of the Comparative Example 1 and the Example before/after activation charge.

Referring FIG. 4D, the Co-2p signal (at 775-790 e.v.) of the cathode plate without the thermal protective film is about 8-10 times greater than that with the thermal protective film. As shown in FIG. 4D, the non-modified LiCoO$_2$ cathode plate had an obvious Co signal, while the modified LiCoO$_2$ cathode plate did not have an obvious Co signal, indicating the presence of a thick nitrogen-containing thermal protective film. Furthermore, the Co signal was even smaller after the activation charge, indicating a denser protective film provided on LiCoO$_2$ due to the charging operation.

DSC and O$_2$ TGA-Mass Analysis

Figure 5A:
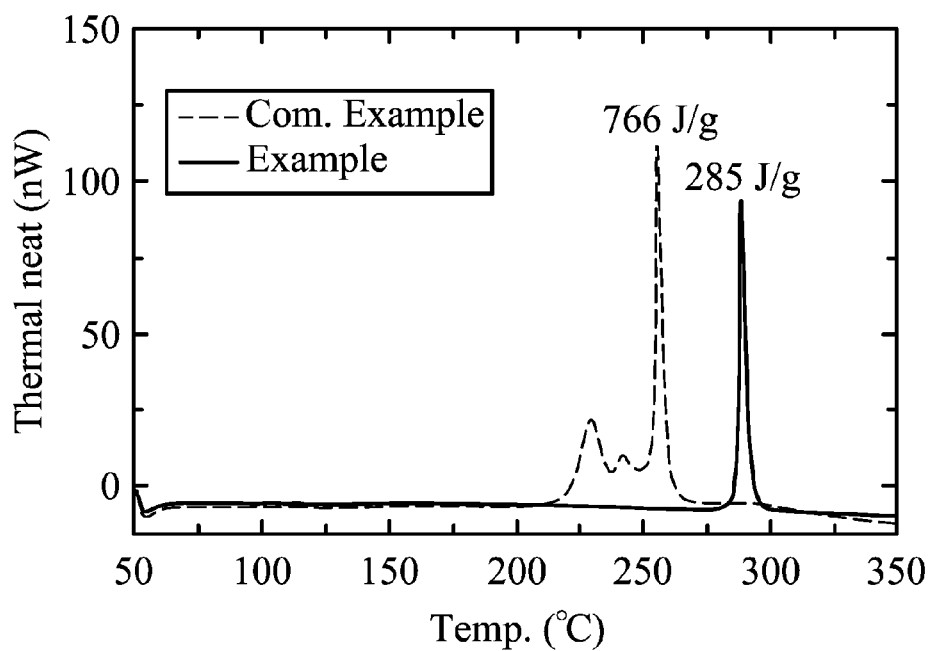
FIG. 5A-5B are the results of DSC thermal analysis and TGA-Mass analysis, respectively, of the coin cell batteries of an Example and a Comparative Example.
Figure 5B:
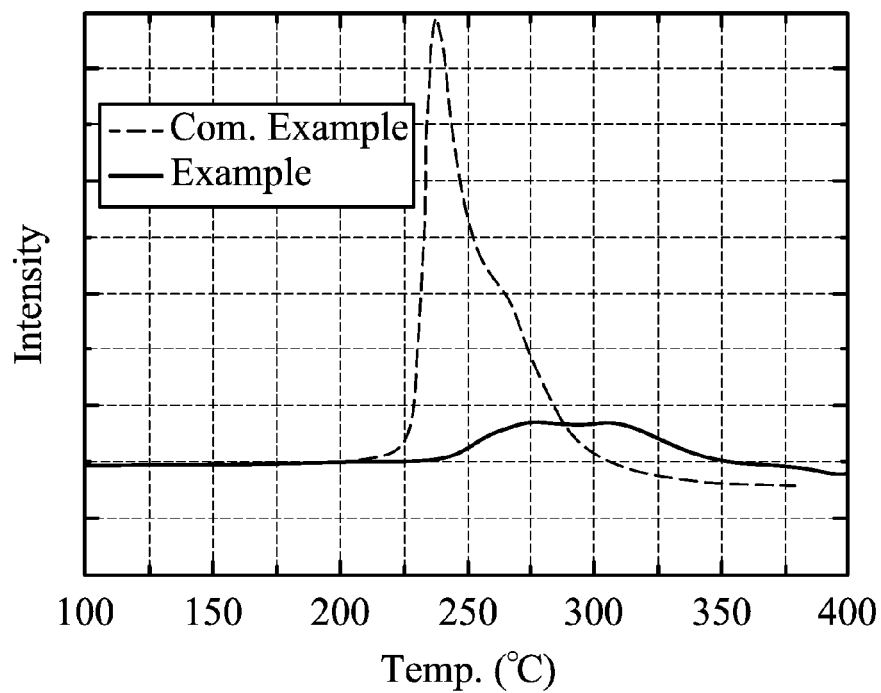

The LiCoO$_2$ cathode plates of the Example and the Comparative Example were assembled into coin-type half cells and fully charged at 4.3V. Next, the half cells were disassembled in a glove box under an atmosphere of Ar. A small portion (7-10 mg) of the disassembled LiCoO$_2$ cathode plate containing the electrolyte was scraped off and placed in a 150 bar pressure resistant sample plate for differential scanning calorimetric (DSC) analysis. The remnant of the disassembled LiCoO$_2$ cathode plate was washed, dried, and subjected to thermogravimetric analysis and mass spectrometry (TGA-Mass) analysis. The result of the DSC thermal analysis shown in FIG. 5A, shows that the initial exothermic temperature was elevated, and the exothermic heat was reduced. Furthermore, the result of the O$_2$ TGA-Mass analysis showed that less oxygen was released from the modified cathode plate when heated than the non-modified cathode plate.

The modified and non-modified LiMn$_2$O$_4$ cathode plates were prepared in the same manner as in the Example and the Comparative Example, using LiMn$_2$O$_4$ as the cathode material powder. Likewise, modified and non-modified LiNi$_{1/3}$Co$_{1/3}$Mn$_{1/3}$O$_2$ cathode plates were prepared using LiNi$_{1/3}$Co$_{1/3}$Mn$_{1/3}$O$_2$ as the cathode material powder. Each of the cathode plates was assembled into a coin-type half cell and fully charged at 4.3V. Next, the half cells were disassembled in a glove box under an atmosphere of Ar. A small portion (7-10 mg) of the disassembled cathode plate containing the electrolyte was scraped off and placed in a 150 bar pressure resistant sample plate for differential scanning calorimetric (DSC) analysis. The results of the DSC analysis are listed in the Table below.

|  | $LiMn_2O_4$ | $LiNi_{1/3}Co_{1/3}Mn_{1/3}O_2$ |
|---|---|---|
| Example (modified by bismaleimide oligomer) | 359 J/g | 854 J/g |
| Com. Example 1 (non-modified) | 743 J/g | 1173 J/g |

As can be seen, the bismaleimide oligomer-modified cathode plates exhibited lower exothermic heat.

Safety Test

The 503759 Li batteries of the Example and the Comparative Examples 1-2 were activated at a voltage of 4.2V. The Li battery of the Example had an average capacity of 1274 mAh at a discharge rate of 0.2 C. The Li battery of the Comparative Example had an average capacity of 1340 mAh at a discharge rate of 0.2 C. The Li batteries of the Example and the Comparative Example were subjected to a nail puncture test, and a thermocouple thermometer was disposed on the nail. The results of the nail puncture test are listed in the Table below.

|  | Number of test samples/test result | Battery shorting point temperature (° C.) |
|---|---|---|
| Com. Example 1 | 2/2 fail | >600° C. |
| Com. Example 2 | 2/2 fail | >600° C. |
| Example | 5/5 pass | 105~200° C. |

As can be seen, the cathode plate modified by the nitrogen-containing polymer improved battery safety by reducing the battery shorting point temperature at the puncture area. In comparison, the Comparative Examples with the non-modified cathode plate or the cathode plate modified by the conventional additive (biphenyl) had a much higher battery shorting point temperature.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lithium battery, comprising
a cathode plate and an anode plate;
a separator disposed between the cathode plate and the anode plate to define a reservoir region;
an electrolyte filled in the reservoir region; and
a non-crosslinked thermal protective film encapsulating an electrode material powder of the cathode plate or the anode plate, wherein the non-crosslinked thermal protective film is capable of undergoing a crosslinking reaction when a battery temperature rises over an onset temperature, and the onset temperature is between about 80° C. and 280° C.

2. The lithium battery as claimed in claim 1, wherein the thermal protective film covers the material of the cathode plate, which comprises a lithium mixed metal oxide, a conductive additive and a binder.

3. The lithium battery as claimed in claim 2, wherein the lithium mixed metal oxide comprises $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M is a transition metal), $LiMn_{0.5}Ni_{0.5}O_2$, $LiNi_xCo_yMn_zO_2$ (x+y+z=1), $LiNi_xCo_yAl_zO_2$(x+y+z=1), $LiMc_{0.5}Mn_{1.5}O_4$ (Mc is a bivalent metal), or combinations thereof.

4. The lithium battery as claimed in claim 2, wherein the conductive additive comprises carbon black, graphite, acetylene black, nickel powder, aluminum powder, titanium powder, stainless steel powder or combinations thereof.

5. The lithium battery as claimed in claim 2, wherein the binder comprises polyvinylidene fluoride (PVDF), styrene-butadiene rubber (SBR), polyamide, melamine resin, or combinations thereof.

6. The lithium battery as claimed in claim 1, wherein the thermal protective film comprises a nitrogen-containing polymer.

7. The lithium battery as claimed in claim 6, wherein the nitrogen-containing polymer is a reaction product of (A) amines, amides, imides, maleimides or imines with (B) diones.

8. The lithium battery as claimed in claim 7, wherein the diones (B) comprise barbituric acid, barbituric acid derivatives, acetylacetone, or acetylacetone derivatives.

9. The lithium battery as claimed in claim 8, wherein the nitrogen-containing polymer is a reaction product of barbituric acid and a bismaleimide monomer.

10. The lithium battery as claimed in claim 1, wherein the onset temperature is between about 100° C. and 220° C.

11. The lithium battery as claimed in claim 1, wherein the onset temperature is between about 130° C. and 200° C.

12. The lithium battery as claimed in claim 1, further comprising a sealant structure wrapped around the cathode plate, the anode plate, the separator, and the electrolyte.

13. The lithium battery as claimed in claim 1, wherein the thermal protective film shows N–1s or S–1s signals when analyzed by an X-ray photoelectron spectroscopy (XPS).

14. The lithium battery as claimed in claim 1, wherein the thermal protective film has a thickness of not less than 25 nm.

15. The lithium battery as claimed in claim 1, wherein a ratio of peak areas of transition metal 2p signal of the thermal protective film at 5 minutes to 0 minutes is greater than 6 according to an X-ray photoelectron spectroscopy (XPS) analysis.

16. A method for fabricating the lithium battery as set forth in claim 1, comprising
providing an electrode material powder;
modifying the electrode material powder with a nitrogen-containing polymer to form a modified electrode material powder;
forming a modified electrode plate comprising the modified electrode material powder, a conductive additive and a binder, wherein the nitrogen-containing polymer encapsulates the modified electrode material powder;
forming a lithium battery comprising the modified electrode plate; and
activating the lithium battery by a charging operation to form a thermal protective film in the modified electrode plate.

17. The method as claimed in claim 16, wherein the electrode material powder is a lithium mixed metal oxide comprising $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M is a transition metal), $LiMn_{0.5}Ni_{0.5}O_2$, $LiNi_xCo_yMn_zO_2$ (x+y+z=1), $LiNi_xCo_yAl_zO_2$ (x+y+z=1), $LiMc_{0.5}Mn_{1.5}O_4$ (Mc is a bivalent metal), or combinations thereof.

18. The method as claimed in claim 17, wherein the modifying comprises modifying the lithium mixed metal oxide powder with a solution of the nitrogen-containing polymer having a solid content of about 1-20%.

19. The method as claimed in claim 16, wherein the nitrogen-containing polymer is a reaction product of (A) amines, amides, imides, maleimides or imines with (B) diones.

20. The method as claimed in claim 16, wherein the diones (B) comprise barbituric acid, barbituric acid derivatives, acetylacetone, or acetylacetone derivatives.

21. The method as claimed in claim 20, wherein the nitrogen-containing polymer is a reaction product of barbituric acid and a bismaleimide monomer.

22. The method as claimed in claim 16, wherein a weight ratio of the modified electrode material powder, the conductive additive, the binder in the modified electrode plate is about 80-93:0.1-5:0.1-5.

23. The method as claimed in claim 16, wherein the conductive additive comprises carbon black, graphite, acetylene black, nickel powder, aluminum powder, titanium powder, stainless steel powder or combinations thereof.

24. The method as claimed in claim 16, wherein the binder comprises polyvinylidene fluoride (PVDF), styrene-butadiene rubber (SBR), polyamide, melamine resin, or combinations thereof.

25. The method as claimed in claim 16, wherein the thermal protective film has an onset temperature of about 80° C. and 280° C.

26. The method as claimed in claim 16, wherein the thermal protective film shows an N-1s or S-1s signal according to an X-ray photoelectron spectroscopy (XPS) analysis.

27. The method as claimed in claim 16, wherein the thermal protective film has a thickness of not less than 25 nm.

28. The method as claimed in claim 16, wherein a ratio of peak areas of transition metal 2p signal of the thermal protective film at 5 minutes to 0 minutes is greater than 6 according to an X-ray photoelectron spectroscopy (XPS) analysis.

29. A lithium battery, comprising
a cathode plate and an anode plate;
a separator disposed between the cathode plate and the anode plate to define a reservoir region;
an electrolyte filled in the reservoir region; and
a non-crosslinked thermal protective film comprising a nitrogen-containing polymer encapsulating an electrode material powder of the cathode plate or the anode plate, wherein the non-crosslinked thermal protective film is capable of undergoing a crosslinking reaction when a battery temperature rises over an onset temperature, and the onset temperature is between about 80° C. and 280° C.

30. The lithium battery as claimed in claim 29, wherein the non-crosslinked thermal protective film is capable of undergoing a crosslinking reaction when a battery temperature rises over an onset temperature between about 80° C. and 280° C.

31. The lithium battery as claimed in claim 29, wherein the thermal protective film covers the material of the cathode plate, which comprises a lithium mixed metal oxide, a conductive additive and a binder.

32. The lithium battery as claimed in claim 31, wherein the lithium mixed metal oxide comprises $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M is a transition metal), $LiMn_{0.5}Ni_{0.5}O_2$, $LiNi_xCo_yMn_zO_2$ (x+y+z=1), $LiMc_{0.5}O_4$ (Mc is a bivalent metal), or combinations thereof.

33. The lithium battery as claimed in claim 31, wherein the conductive additive comprises carbon black, graphite, acetylene black, nickel powder, aluminum powder, titanium powder, stainless steel powder or combinations thereof.

34. The lithium battery as claimed in claim 31, wherein the binder comprises polyvinylidene fluoride (PVDF), styrene-butadiene rubber (SBR), polyamide, melamine resin, or combinations thereof.

35. The lithium battery as claimed in claim 29, wherein the nitrogen-containing polymer is a reaction product of (A) amines, amides, imides, maleimides or imines with (B) diones.

36. The lithium battery as claimed in claim 35, wherein the diones comprise barbituric acid, barbituric acid derivatives, acetylacetone, or acetylacetone derivatives.

37. The lithium battery as claimed in claim 36, wherein the nitrogen-containing polymer is a reaction product of barbituric acid and a bismaleimide monomer.

38. The lithium battery as claimed in claim 29, wherein the onset temperature is between about 100° C. and 220° C.

\* \* \* \* \*